Figure 1:
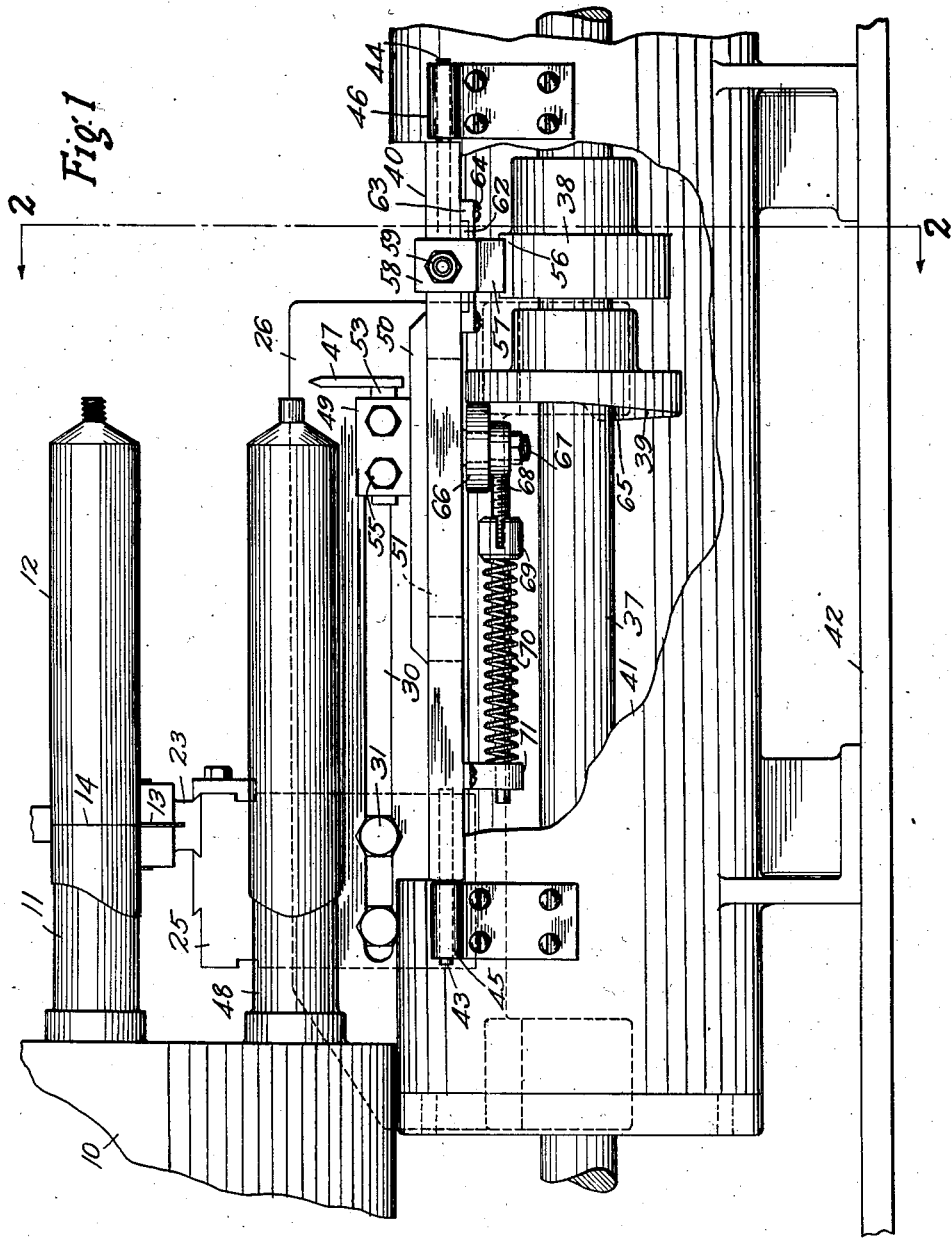

July 28, 1942.  L. T. MEDHOLDT  2,291,591
THREADER FOR COLLAPSIBLE TUBE TRIMMING MACHINES
Filed Feb. 28, 1941  2 Sheets-Sheet 1

INVENTOR
Lewis T. Medholdt
BY
ATTORNEY

July 28, 1942.   L. T. MEDHOLDT   2,291,591
THREADER FOR COLLAPSIBLE TUBE TRIMMING MACHINES
Filed Feb. 28, 1941   2 Sheets-Sheet 2

INVENTOR
Lewis T. Medholdt
BY
ATTORNEY

Patented July 28, 1942

2,291,591

UNITED STATES PATENT OFFICE 2,291,591

THREADER FOR COLLAPSIBLE TUBE TRIMMING MACHINES

Lewis T. Medholdt, Woodside, Long Island, N. Y., assignor to Victor Metal Products Corporation, Brooklyn, N. Y., a corporation of New York Application February 28, 1941, Serial No. 381,045

11 Claims. (Cl. 82—5)

This invention relates to machines for operating upon collapsible tubes, and of the type known as "trimming" machines and relates particularly to the means for cutting the ends of the tube including the means for cutting a thread upon the neck end of the tube.

Collapsible tubes after being extruded in a suitable press from a slug vary considerably in length and also have open ends of irregular shape. Such tubes are therefore mounted on the mandrel of a trimming machine, and trimmed at both ends to the required length. Other operations are also performed upon the tube by the machine. In the patent to George W. Temple, No. 2,114,272, dated April 12, 1938, for Adjustable trimmer for collapsible tube making machines, is disclosed a rotary cutter for trimming the open end of the tube and a flattener for flattening the trimmed open end. Said patent further discloses an adjustable mounting for the cutter and the flattener, whereby the tubes may be trimmed to considerably different lengths if desired.

In the machine of the present invention, a somewhat different type of mounting for the cutter and flattener is disclosed, which mounting permits the cutter and flattener to be moved along one side of the machine through a distance equal to the greater part of the length of the mandrel on which the work is mounted, so that work may be cut to substantially any desired length. The use of such mounting is made possible by the employment of a different type of actuating means for the tool which cuts the thread on the neck end of the tube. The actuating means is, in the present invention, mounted on the bed of the machine below the turret and substantially enclosed by the bed casting, and is spaced away from that side of the machine carrying the cutter mounting whereby interference with the adjustment of the cutter and flattener is avoided.

In the threading mechanism of the prior art, bodily movable and oscillatory spring-pressed levers were customarily employed to give the threading tool the desired movement. Such mounting of the levers and the springs was defective in that the stresses of the thread cutting operation quickly wore out the bearings for the levers used permitting said levers to get out of adjustment and causing injury to the tool levers or springs and excessive amount of spoiled work and wastage, and also interfering with and limiting the range of adjustment of the cutter and flattener.

The present invention therefore contemplates the provision of an efficient actuating means for the threading tool arranged out of the way of the end cutting and flattening means, the actuating means being easily adjustable, efficient, durable and accurate, and hence certain and dependable.

This invention further contemplates the provision of a reciprocating tool carrying plate slidably mounted on a hinged plate, both being actuated by suitable cams to produce the required motions of the threading tool and being arranged in such a manner as to permit a wide range of adjustment of the associated end trimmer and flattener.

The various objects of the invention will be clear from the description which follows and from the drawings, in which, Fig. 1 is a front elevation of the machine partly broken away to show the cams for operating the threading tool.

Figure 2:
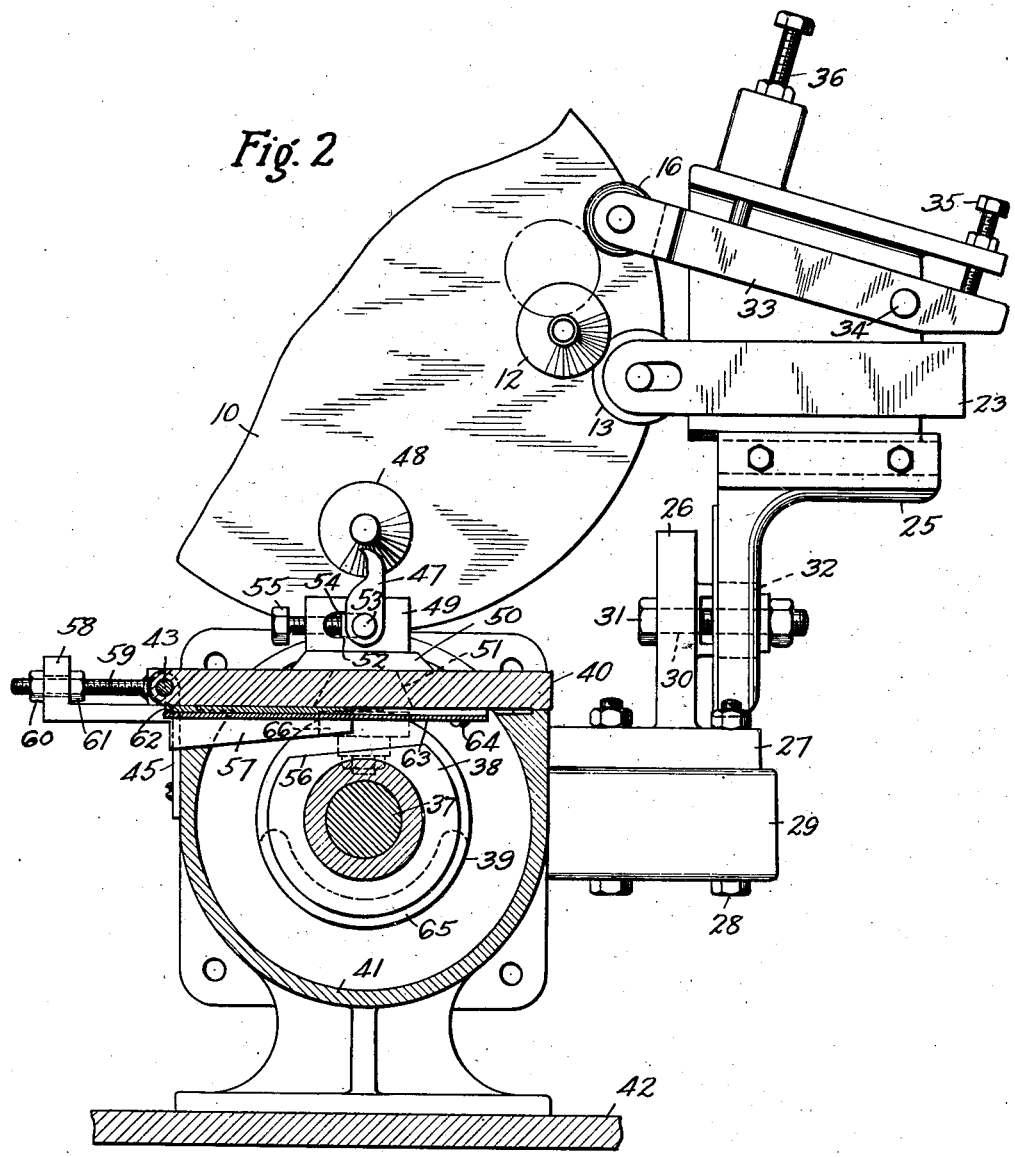

Fig. 2 is a vertical section of the same taken on the line 2—2 of Fig. 1.

In the practical embodiment of my invention which I have illustrated by way of example, the turret 10, usually provided in collapsible tube trimming machines, is intermittently rotated to carry the mandrels 11 from station to station. Each of the mandrels may be provided with suitable mechanism for rotating the mandrels at a predetermined speed while the turret is at rest at any given station such as the trimming and threading stations in a manner well known in the art and hence which need not be further described nor illustrated except to say that such mechanism is shown for example, in the patent to Walter Prussing for Automatic tube finishing and advancing machine, Re. No. 19,578, dated May 21, 1935.

As the mandrel 11 is brought to the trimming station by the turret with the tube 12 thereon, said mandrel is rotated while the turret is at rest. By reason of the pressed engagement of the tube with the rotatable sharpened trimming disc or cutter 13, a cut as 14 is made at the proper point in the length of the tube to trim the tube to its proper length. During the trimming of the tube, owing to the sharpened bevelled edge of the cutter 13, the material of the tube is slightly indented. It therefore becomes advisable to flatten the thus indented part of the tube. This is done by the revoluble flattener 16 which engages and presses flat the material of the tube adjacent the cut 14 as the mandrel 11 is rotated about its own axis and is also moved from the trimming station to the next station and as is shown by the dash-dot lines of Fig. 2.

The cutter 13 is rotatably mounted on a suitable spring-pressed rod carried by the slide 23 on the bracket 25 all as is described in detail in said Patent #2,114,272. The bracket 25 is secured for vertical adjustment to the longitudinally arranged slotted standard 26 upstanding from its base 27 and secured as by means of the bolts 28 along one side of the machine frame 29. The standard 26 is of substantial length and is provided with a slot 30 extending parallel to the axis of the mandrel and of substantially the length of the mandrel. The bolts 31 passing through the slot 30 and through the slot 32 of the bracket 25 serve to secure the bracket adjustably in place, whereby said bracket and the parts carried thereby may be adjusted vertically as well as being adjustable horizontally through a wide range to arrange the cutter 13 substantially at either end of the mandrel or at any point therebetween and thereby to make possible the trimming of tubes to any desired length. The straightener arm 33 is pivotally mounted as at 34 and may be adjusted by means of the adjusting screws 35 and 36. It will be noted that by adjusting the bracket 25 with respect to the standard 26, the cutter 13 and flattener 16 together with the supporting and adjusting means therefor are moved as a unit to the desired position relatively to the mandrel.

To permit said adjustment without interference, the threading mechanism is arranged at a point in horizontal spaced relation to that part of the frame 29 on which the standard 26 is mounted. The threading mechanism comprises the cam shaft 37 which carries two cams 38 and 39 suitably connected to the hinge plate 40 resting on the hollow frame 41 which is concentric with the shaft 37 and which is suitably supported by a fixed part 42 of the machine. The plate 40 is provided with suitable hinge pins as 43, 44 received respectively in the fixed bearings 45, 46 secured to the frame 41. Said plate is thereby supported for oscillatory movement about the hinge pins at the proper time to carry the threading tool 47 into engagement with the neck of a tube on the lowermost mandrel 48 and thereby to initiate the threading operation.

The tool is carried by a longitudinally movable slide plate mounted on the plate 40 and slidable relatively thereto under the action of its cam at a predetermined rate in relation to the speed of rotation of the mandrel, thereby to cut the threads on the neck of the tube during the movement of the slide plate on the hinge plate. Said tool 47 is adjustably supported by a shaft 53 adjustably held by the support block 49 upstanding from the slide plate 50, the slide plate being provided with the dovetail projection 51 slidably mounted in a corresponding dovetail groove in the hinge plate 40. A clamp block 52 terminates in a suitable concave surface engaging the shaft 53 of the cutting tool and slidable in the groove 54 of the support block 49. The adjusting screws 55 serve to clamp the cutting tool in place by exerting pressure on the clamp block 52 and therethrough clamping the shaft 53. The shaft 53 may readily be adjusted longitudinally of the mandrel to adjust the tool accurately before clamping it in position.

The cams 38 and 39 impart the required motions in a rectangular path to the cutting tool 47 through the intermediate connections therebetween. First, the tool is lifted vertically into alignment with the tube neck. Then the tool is moved horizontally toward the left as viewed in Fig. 1 to cut the thread. Then the tool is lowered vertically away from the neck, and finally it is moved horizontally toward the right back to its initial position. The cam 38 is effective to raise and lower the tool at the proper time by alternately raising and lowering the hinge plate. Said cam is provided with a cut away part forming thereon the flat surface 56 which is designed to engage the adjustable adjusting wedge 57. At the left end of said wedge, as viewed in Fig. 2, is provided the arm 58, through which passes the adjusting screw 59 abutting at one end against the hinge plate 40 and carrying the adjusting and lock nuts 60, 61. The wedge arm 58 is provided with an extension 62 slidably supported in a suitable groove of the grooved bracket 63 which is suitably secured to the hinge plate as by means of the screw 64.

On the rotation of the cam 38, the surface 56 thereof engages the under cooperating surface of the wedge and raises the wedge, thereby swinging it together with the hinge plate 40 and the parts carried thereby about the hinge pins 43, 44 in a counterclockwise direction as viewed in Fig. 2. The hinge plate 40 as well as the sliding plate 50, the block 49 and the threading tool 47 are thereby lifted the exact required amount to carry the cutting edge of the tool into alignment with the neck of the tube while the tube is rotating with the mandrel. Immediately after such alignment is made, the cam 39 becomes operative to slide the slide plate 50 relatively to the hinge plate and thereby to carry the cutting edge of the tool inwardly along the neck and to cut the thread in said neck. The cam surface 65 of the cam 39 is engaged by the roller 66 which is mounted on the pin 67 projecting downwardly from the dovetail slide member 51 of the slide plate. Consequently, on the rotation of the cam 39, the roller 66 and its slide plate and cutting tool are moved toward the left as viewed in Fig. 1, and while the hinge plate is retained by the cam 38 and the wedge 57 in its raised position.

On the pin 67 is the adjusting screw 68 carrying the spring-engaging member 69 which engages the spring 70 at one end, said spring abutting against the fixed bracket 71 at its other end. It will be understood, therefore, that as the cutting tool moves toward the left, the spring 70 is compressed ready to cause the tool to make its return movement. When the threading operation on the neck has been completed, the wedge 57 is released by its cam permitting the hinge plate 40 to drop and thereby to lower the tool away from the neck, whereafter the cam 39 releases the roller 66, the spring 70 moving said roller toward the right as permitted by the shape of the cam surface of the cam 39 to carry the tool to its initial position.

It will be noted that the threading tool and its operating mechanism is arranged below the turret 10 and in transverse spaced relation to the standard 26 which carries the end trimming and flattening mechanism. Consequently, the latter mechanism may be adjusted throughout the wide range desired without interference by the threading mechanism.

It will further be seen that because of the construction of the parts, long repeated operation of the tool does not cause any substantial wear sufficient to permit material back lash or lost motion in the operating mechanism so that the mechanism may be used repeatedly through a long period of time without the necessity for any adjustment, repair, or replacement. Finally, it will be seen that though the mechanism is simple, it is durable and well designed to carry out the purposes contemplated.

While I have shown and described certain specific embodiments of my invention, I do not wish to be understood as limiting myself thereto, but intend to claim the invention as broadly as may be permitted by the state of the prior art and the scope of the appended claims.

I claim:

1. In a collapsible tube trimming machine including a threading tool, means for moving said tool in a substantially rectangular path in a vertical plane comprising a clamp for adjustably holding the tool, a horizontally reciprocating slide plate carrying the clamp, a hinged plate carrying the slide plate and swingable about a horizontal axis, cam means for oscillating the hinged plate and additional cam means including a spring for reciprocating the slide plate relatively to the hinged plate.

2. In a collapsible tube trimming machine, a threading tool, and means for moving said tool in a substantially rectangular path including means for reciprocating the tool in a horizontal direction, a cam having a flat cut-away part, a wedge in the path of the cam, means for longitudinally adjusting the wedge to vary the distance between the wedge and said flat cam part, and means operatively connecting the wedge and the tool to move the tool in a substantially vertical direction after each horizontal movement of the tool.

3. In a collapsible tube trimming machine, a threading tool, means for slidably supporting the tool, oscillatory means for supporting the slidable means and means for oscillating the oscillatory means including a longitudinally adjustable wedge carried by the oscillatory means and a revoluble cam arranged to engage and to alternately raise and lower the wedge.

4. In a collapsible tube trimming machine, a threading tool, a first plate slidably supporting the tool, a second plate hingedly mounted adjacent one end thereof and carrying the first plate, a tongue and groove connection between said plates, means for sliding the first plate relatively to the second plate and adjustable means for oscillating the second plate.

5. In a collapsible tube trimming machine, a threading tool, a first plate slidably supporting the tool, a second plate hingedly mounted adjacent one end thereof and carrying the first plate, means for sliding the first plate relatively to the second plate and adjustable means for oscillating the second plate, said means including a cam, and an adjustable wedge in the path of the cam and carried by the second plate.

6. A machine in accordance with claim 4 in which the adjustable means comprises a wedge slidably mounted on the under side of the second plate, an adjusting screw operatively connected to the wedge and holding the wedge in its adjusted position, and a circular revoluble cam having a flat chord surface arranged to engage the under face of the wedge, said cam being operative first to lift the wedge, then to hold it in lifted position, and finally to permit the wedge to drop.

7. In a collapsible tube trimming machine, a hollow frame open at its top, a cam shaft within the frame, a lifting cam on the shaft, a second cam on the shaft, a first plate hingedly mounted at the top of the frame normally to close said top, adjustable means between the lifting cam and the plate to control the amount of movement of the plate, a slide plate on and slidable relatively to the first plate, means operatively connecting the slide plate to the second cam, a threading tool, and means for adjustably clamping the tool to the second plate.

8. In a collapsible tube trimming machine, a hollow frame having an open top, a cam shaft within the frame, a first plate hingedly mounted at said top, a slide plate on and slidable relatively to the first plate, a threading tool adjustably mounted on the slide plate, means on the cam shaft for oscillating the first plate, and means on the cam shaft for reciprocating the slide plate.

9. In a collapsible tube trimming machine having an end trimmer and flattener carried by a slotted support, a hollow frame, a cam shaft in the hollow frame, a first plate normally resting on the top of the hollow frame, means for hingedly supporting the plate, a second plate slidable relatively to and carried by the first plate, cam means on the shaft for oscillating the first plate and for reciprocating the second plate, and a threading tol adjustably mounted on the second plate.

10. In a collapsible tube trimming machine, a hollow frame, a cam shaft within the frame, a pair of cams on said shaft, a first plate at the top of the frame and above said shaft, said plate having a dovetail groove therein, means on the frame for pivotally supporting a longitudinal edge of the plate for oscillatory movement of the plate, a wedge slidably secured to the under side of the plate in position for engagement by one of the cams, an adjusting screw operatively connected to the wedge to move the wedge in a direction perpendicular to the axis of the shaft and thereby to adjust the movement of the plate, a second plate on the upper surface of the first plate, a dovetail projection on the second plate slidable in the groove of the first plate, said second plate carrying a clamping block having an opening therethrough, a tool shaft arranged in the opening, means for adjustably securing the tool shaft in the opening, a threaded tool carried by the tool shaft, and a spring-pressed roller depending from the dovetail projection of the second plate and engaged by the other of the cams.

11. In a collapsible tube trimming machine having a rotatable mandrel and provided with an end trimmer and flattener mounted on a single support, a slotted standard having a slot therein of substantially the length of the mandrel, means passing through the slot for clamping the support in adjusted position at a selected point of the standard, a neck threading tool, and means in transverse spaced relation to the standard for giving the tool a movement in a rectangular path in a vertical plane, said means comprising a slide plate, adjustable tool clamping means carried by the slide plate, a hinged plate slidably carrying the slide plate, a wedge adjustably mounted on the hinged plate, cam means cooperating with the wedge to raise and to lower the hinged plate and thereby to lift and lower the tool, and cam means for sliding the slide plate in opposite directions alternately on the hinged plate and between alternate movements of the hinged plate.

LEWIS T. MEDHOLDT.